United States Patent
Xia et al.

(10) Patent No.: US 12,340,542 B2
(45) Date of Patent: Jun. 24, 2025

(54) METHOD FOR ANALYZING DROPLETS BASED ON IMAGES, COMPUTER DEVICE AND STORAGE MEDIUM

(71) Applicant: MGI Tech Co., Ltd., Shenzhen (CN)

(72) Inventors: Yun Xia, Shenzhen (CN); Yang Xi, Shenzhen (CN); Xia Zhao, Shenzhen (CN); Xingye Cui, Shenzhen (CN); Hanjie Shen, Shenzhen (CN); Fang Chen, Shenzhen (CN); Hui Jiang, Shenzhen (CN)

(73) Assignee: MGI Tech Co., Ltd., Shenzhen (CN)

( * ) Notice: Subject to any disclaimer, the term of this patent is extended or adjusted under 35 U.S.C. 154(b) by 388 days.

(21) Appl. No.: 17/799,488

(22) PCT Filed: Feb. 14, 2020

(86) PCT No.: PCT/CN2020/075309
§ 371 (c)(1),
(2) Date: Aug. 12, 2022

(87) PCT Pub. No.: WO2021/159479
PCT Pub. Date: Aug. 19, 2021

(65) Prior Publication Data
US 2023/0342978 A1    Oct. 26, 2023

(51) Int. Cl.
*G06T 7/00* (2017.01)
*G01N 21/64* (2006.01)
(Continued)

(52) U.S. Cl.
CPC ........... *G06T 7/97* (2017.01); *G01N 21/6428* (2013.01); *G01N 21/6456* (2013.01); *G06T 5/70* (2024.01);
(Continued)

(58) Field of Classification Search
CPC .... G06T 7/97; G06T 5/70; G06T 5/94; G06T 7/00; G06T 7/11; G06T 7/136;
(Continued)

(56) References Cited

U.S. PATENT DOCUMENTS

2017/0175174 A1    6/2017    Chiu et al.

FOREIGN PATENT DOCUMENTS

| CN | 103106653 | 5/2013 |
| CN | 104165873 | 11/2014 |

(Continued)

*Primary Examiner* — Charlotte M Baker
(74) *Attorney, Agent, or Firm* — ScienBiziP, P.C.

(57) ABSTRACT

A method for analyzing droplets based on images: obtaining a working dye channel image and a reference dye channel image corresponding to a droplet system (S1); separately performing a preset image processing operation on the working dye channel image and the reference dye channel image (S2); using the working dye channel image or the reference dye channel image as a target image (S3), and determining a region in which each droplet is located from within the target image (S4); and on the basis of the determined region in which each droplet is located, analyzing the droplet system (S5). The method can effectively improve the accuracy of droplet analysis. Further provided are a computer device and a storage medium.

20 Claims, 5 Drawing Sheets

(51) Int. Cl.
    *G06T 5/70*     (2024.01)
    *G06T 5/94*     (2024.01)
    *G06T 7/11*     (2017.01)
    *G06T 7/136*    (2017.01)
    *G06T 7/30*     (2017.01)

(52) U.S. Cl.
    CPC .................. *G06T 5/94* (2024.01); *G06T 7/00* (2013.01); *G06T 7/11* (2017.01); *G06T 7/136* (2017.01); *G06T 7/30* (2017.01); *G01N 2021/6439* (2013.01); *G06T 2207/10064* (2013.01)

(58) Field of Classification Search
    CPC ... G06T 7/30; G06T 2207/10064; G06T 5/92; G06T 7/62; G06T 2207/20152; G06T 2207/30242; G06T 5/40; G06T 2207/10056; G06T 2207/20224; G01N 21/6428; G01N 21/6456; G01N 2021/6439; G01N 15/1433; G01N 2015/003; G01N 2015/1486; G01N 15/1429; G01N 21/6452; G01N 21/6458; G01N 2021/6441
    USPC ........................................................ 382/173
    See application file for complete search history.

(56)     References Cited

FOREIGN PATENT DOCUMENTS

CN          106190945       12/2016
WO    WO-2009068546 A1 *    6/2009   ......... G01N 21/6428

\* cited by examiner

| Number | Pixel area | $I_{Abs}$ | $I_{Ref}$ | $I_{Rela} = I_{Abs}/I_{Ref}$ | Threshold value | Classification result |
|---|---|---|---|---|---|---|
| 1 | 41688 | 181.3267 | 53.56853 | 3.384947 | 2.9 | + |
| 2 | 41256 | 183.1368 | 53.69461 | 3.410711 | 2.9 | + |
| 3 | 1416 | 175.303 | 52.59675 | 3.332962 | 2.9 | + |
| 4 | 7295 | 182.9883 | 53.77204 | 3.403039 | 2.9 | + |
| 5 | 1131 | 82.09195 | 53.86914 | 1.523914 | 2.9 | - |
| 6 | 14052 | 182.3133 | 54.14105 | 3.367376 | 2.9 | + |
| 7 | 4148 | 178.9851 | 53.29605 | 3.358318 | 2.9 | + |
| 8 | 2171 | 177.5288 | 53.46016 | 3.320768 | 2.9 | + |
| 9 | 578 | 79.27682 | 51.32353 | 1.544649 | 2.9 | - |
| 10 | 36644 | 185.5811 | 53.22689 | 3.486604 | 2.9 | + |
| 11 | 2628 | 179.3421 | 53.72717 | 3.338015 | 2.9 | + |
| 12 | 191 | 89.06283 | 49.81675 | 1.787809 | 2.9 | - |
| 13 | 554 | 90.66245 | 50.95668 | 1.779207 | 2.9 | - |
| 14 | 972 | 175.4321 | 53.22634 | 3.295964 | 2.9 | + |
| 15 | 10608 | 178.2369 | 56.68873 | 3.144133 | 2.9 | + |

METHOD FOR ANALYZING DROPLETS BASED ON IMAGES, COMPUTER DEVICE AND STORAGE MEDIUM

FIELD

The disclosure relates to a technical field of image processing, and in particular, to a method for analyzing droplets based on images, a computer device, and a storage medium.

BACKGROUND TECHNIQUE

Emulsification disperses extremely small droplets of a liquid uniformly in another immiscible liquid. This dispersion can efficiently and conveniently realize an emulsification partition of a homogeneous biochemical system solution. Droplet technology is a discontinuous flow microfluidic technology that uses emulsification to generate dispersed droplets from two immiscible liquid phases for experimental operations. So far, droplet technology has been widely used in analysis and detection of different biomolecules such as nucleic acids, proteins, polysaccharides, metal ions and small molecules, as well as biomedical fields such as drug delivery. In these droplet technology applications, a method of continuous capillary counting and a method of plane scanning are generally used to obtain information such as a total number, a volume, and signals of the droplets, so as to perform qualitative analysis or quantitative analysis of analytes contained in the droplets. For example, in digital PCR, the method of continuous capillary counting is often used to transfer droplets of a single volume which have completed a reaction to a capillary for optical reading and analysis to obtain information on a total number and light intensities of the droplets. However, this method of continuous capillary counting requires a use of a microfluidic system to maintain a stable flow rate, and droplets need to be detected and read one by one, throughput is slow and time-consuming. An alternative method is to form an ordered two-dimensional array of droplets, and use the method of plane scanning to obtain image information of all droplets at one time, and then extract and analyze the obtained image information to obtain information such as the total number, the volume, and signals of droplets and classify the information, for calculating absolute quantification of analytes.

However, the method of plane scanning still has great limitations for a detection of arrays of droplets, mainly due to the following two points:

(1) Currently, the method is only suitable for droplet systems of a single volume. When such droplet systems are spread out in a container to form two-dimensional monolayer droplets, each droplet in a scanning plane has a same perpendicular height, so that excitation and acquisition of optical signals are uniform, and an intensity of the optical signal can well reflect information such as the volume and the state of the droplet. However, once the volume of the droplet changes or the droplet system no longer has a single volume, the droplet will have a change of height due to the change in volume, which affects the uniformity of optical signals, making collected signals unable to accurately reflect the information such as the volume and the state of each droplet, which brings a large calculation error. For example, as shown in FIG. 1, which is a schematic diagram of a variation of intensity of optical signals due to a volume variation of the droplets in the method of plane scanning. Among them, in FIG. 1, "A" indicates that a single-layer two-dimensional tiling of droplets having single volume does not cause intensity variation of optical signals; "B" indicates that a single-layer two-dimensional tiling of droplets having multi volumes cause intensity variation of optical signals; "C" indicates that squeezed quasi-2D tiling single-volume droplets does not cause intensity variation of optical signals; "D" indicates that squeezed quasi-2D tiling multi-volume droplets causes intensity variation of optical signals.

(2) A spatial stability of two-dimensional or quasi-two-dimensional single-layer droplets is much lower than that of solid-phase chips, and it is very easy to be disturbed by external environment to cause droplets to flow, local disturbance or Brownian motion, so that when the method of plane scanning is used to capture a plurality of images, it is easy to cause problems such as droplet displacement or repeated counting. For example, referring to FIG. 2, a reference dye channel image 21 and a working dye channel image 22 are captured by the method of plane scanning. By comparing a position indicated by an arrow 211 in the reference dye channel image 21 and a position indicated by an arrow 221 in the working dye channel image 22, it can be seen that droplet displacements are occurred when the reference dye channel image 21 and the working dye channel image 22 are captured.

Based on the above reasons, there is an urgent need for a method of analyzing droplets that can effectively overcome the above drawbacks.

SUMMARY OF THE INVENTION

In view of the above, it is necessary to propose a method for analyzing droplets based on images, a computer device and a storage medium, which can accurately analyze droplets.

The method for analyzing droplets based on images, includes: an acquiring step, acquiring a working dye channel image and a reference dye channel image corresponding to a droplet system; an image processing step, separately performing a preset image processing operation on the working dye channel image and the reference dye channel image; a target determination step, taking the working dye channel image or the reference dye channel image as a target image; a region determination step, determining a region where each droplet is located from the target image; and an analysis step, analyzing the droplet system based on the determined region where each droplet is located.

Preferably, the acquiring step includes: exciting a working dye and a reference dye in the droplet system separately under a condition of a dual/multi-channel wavelength, obtaining the working dye channel image by capturing a fluorescence image of a channel corresponding to the working dye, and obtaining the reference dye channel image by capturing a fluorescence image of a channel corresponding to the reference dye.

Preferably, the image processing step includes: separately performing a correction operation for uneven background brightness on the working dye channel image and the reference dye channel image; separately performing an image enhancement processing on the reference dye channel image and the working dye channel image by using a preset image enhancement algorithm; and separately performing a noise reduction processing on the working dye channel image and the reference dye channel image by using a preset noise reduction algorithm.

Preferably, the region determination step includes: performing a local contrast enhancement processing on the target image; obtaining a grayscale image by performing a grayscale conversion on the target image, and obtaining a binarized target image by binarizing the grayscale image; dividing the binarized target image into several discrete image regions, and each image region in the several discrete image regions being corresponding to a single droplet, thereby determining the region where each droplet is located Preferably, a registration step is further included before the region determination step, and the registration step includes: determining one of the working dye channel image and the reference dye channel image that is not taken as the target image as a non-target image, taking the target image as a fixed benchmark, and performing a registration operation on the non-target image.

Preferably, the taking of the target image as the fixed benchmark, and the performing of the registration operation on the non-target image includes: taking the target image as the fixed benchmark; obtaining a first transformation matrix by performing a first image registration operation on the non-target image; and obtaining a first registration image based on the first transformation matrix and the non-target image; taking the target image as the fixed benchmark; obtaining a second transformation matrix by performing a second image registration operation on the first registration image; obtaining a second registration image based on the second transformation matrix and the first registration image; and determining the second registration image as a registered non-target image.

Preferably, the analysis step includes: calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located; calculating the relative light intensity ($I_{rela}$) of each droplet based on the average light intensity ($I_{Abs}$) of each droplet on the working dye channel and the average light intensity ($I_{Ref}$) of each droplet on the reference dye channel image, and $I_{Rela}=I_{Abs}/I_{Ref}$.

The computer device, characterized in that the computer device includes a storage device and a processor, the storage device storing at least one computer readable instruction, the processor is configured to execute the at least one computer readable instruction to implement the following steps: an acquiring step, acquiring a working dye channel image and a reference dye channel image corresponding to a droplet system; an image processing step, separately performing a preset image processing operation on the working dye channel image and the reference dye channel image; a target determination step, taking the working dye channel image or the reference dye channel image as a target image; a region determination step, determining a region where each droplet is located from the target image; and an analysis step, analyzing the droplet system based on the determined region where each droplet is located.

Preferably, the processor is configured to execute the at least one computer readable instruction to implement the obtaining step, includes: exciting a working dye and a reference dye in the droplet system separately under a condition of a dual/multi-channel wavelength, obtaining the working dye channel image by capturing a fluorescence image of a channel corresponding to the working dye, and obtaining the reference dye channel image by capturing a fluorescence image of a channel corresponding to the reference dye.

Preferably, the processor is configured to execute the at least one computer readable instruction to implement the image processing step, includes: separately performing a correction operation for uneven background brightness on the working dye channel image and the reference dye channel image; separately performing an image enhancement processing on the reference dye channel image and the working dye channel image by using a preset image enhancement algorithm; and separately performing a noise reduction processing on the working dye channel image and the reference dye channel image by using a preset noise reduction algorithm.

Preferably, the processor is configured to execute the at least one computer readable instruction to implement the region determination step, includes: performing a local contrast enhancement processing on the target image; obtaining a grayscale image by performing a grayscale conversion on the target image, and obtaining a binarized target image by binarizing the grayscale image; dividing the binarized target image into several discrete image regions, and each image region in the several discrete image regions being corresponding to a single droplet, thereby determining the region where each droplet is located;

Preferably, the processor is configured to execute the at least one computer readable instruction to implement a registration step before the region determination step, includes: determining one of the working dye channel image and the reference dye channel image that is not taken as the target image as a non-target image, taking the target image as a fixed benchmark, and performing a registration operation on the non-target image.

Preferably, the processor is configured to execute the at least one computer readable instruction to implement the taking of the target image as the fixed benchmark, and the performing of the registration operation on the non-target image, includes: taking the target image as the fixed benchmark; obtaining a first transformation matrix by performing a first image registration operation on the non-target image; and obtaining a first registration image based on the first transformation matrix and the non-target image; taking the target image as the fixed benchmark; obtaining a second transformation matrix by performing a second image registration operation on the first registration image; obtaining a second registration image based on the second transformation matrix and the first registration image; and determining the second registration image as a registered non-target image.

Preferably, the processor is configured to execute the at least one computer readable instruction to implement the analysis step, includes: calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located; calculating the relative light intensity (I a) of each droplet based on the average light intensity ($I_{Abs}$) of each droplet on the working dye channel and the average light intensity ($I_{Ref}$) of each droplet on the reference dye channel image, and $I_{Rela}=I_{Abs}/I_{Ref}$.

The non-volatile readable storage medium, characterized in that, the non-volatile readable storage medium stores at least one computer readable instruction, and the at least one computer readable instruction implements the following steps when executed by a processor: an acquiring step, acquiring a working dye channel image and a reference dye channel image corresponding to a droplet system; an image processing step, separately performing a preset image processing operation on the working dye channel image and the reference dye channel image; a target determination step, taking the working dye channel image or the reference dye channel image as a target image; a region determination step, determining a region where each droplet is located from the target image; and an analysis step, analyzing the droplet system based on the determined region where each droplet is located.

Preferably, the at least one computer readable instruction executed by the processor implements the acquiring step, includes: exciting a working dye and a reference dye in the droplet system separately under a condition of a dual/multi-channel wavelength, obtaining the working dye channel image by capturing a fluorescence image of a channel corresponding to the working dye, and obtaining the reference dye channel image by capturing a fluorescence image of a channel corresponding to the reference dye.

Preferably, the at least one computer readable instruction executed by the processor implements the image processing step, includes: separately performing a correction operation for uneven background brightness on the working dye channel image and the reference dye channel image; separately performing an image enhancement processing on the reference dye channel image and the working dye channel image by using a preset image enhancement algorithm; and separately performing a noise reduction processing on the working dye channel image and the reference dye channel image by using a preset noise reduction algorithm.

Preferably, the at least one computer readable instruction executed by the processor implements the region determination step, includes: performing a local contrast enhancement processing on the target image; obtaining a grayscale image by performing a grayscale conversion on the target image, and obtaining a binarized target image by binarizing the grayscale image; dividing the binarized target image into several discrete image regions, and each image region in the several discrete image regions being corresponding to a single droplet, thereby determining the region where each droplet is located.

Preferably, the at least one computer readable instruction executed by the processor implements a registration step before the region determination step, includes: determining one of the working dye channel image and the reference dye channel image that is not taken as the target image as a non-target image, taking the target image as a fixed benchmark, and performing a registration operation on the non-target image; taking the target image as the fixed benchmark; obtaining a first transformation matrix by performing a first image registration operation on the non-target image; and obtaining a first registration image based on the first transformation matrix and the non-target image; taking the target image as the fixed benchmark; obtaining a second transformation matrix by performing a second image registration operation on the first registration image; obtaining a second registration image based on the second transformation matrix and the first registration image; and determining the second registration image as a registered non-target image.

Preferably, the at least one computer readable instruction executed by the processor implements the analysis step, includes: calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located; calculating the relative light intensity ($I_{rela}$) of each droplet based on the average light intensity ($I_{Abs}$) of each droplet on the working dye channel and the average light intensity ($I_{Ref}$) of each droplet on the reference dye channel image, and $I_{Rela}=I_{Abs}/I_{Ref}$.

The method for analyzing droplets based on images, the computer device, and the storage medium described in the embodiments of the present disclosure can improve the accuracy of droplet analysis.

DESCRIPTION OF THE DRAWINGS

In order to more clearly illustrate the embodiments of the present disclosure or the technical solutions in the prior art, the following briefly introduces the accompanying drawings required for the description of the embodiments or the prior art. Obviously, the drawings in the following description are only embodiments of the present disclosure. For those of ordinary skill in the art, other drawings can also be obtained according to the provided drawings without any creative effort.

The following specific embodiments further illustrates the present disclosure in conjunction with the above drawings.

DETAILED DESCRIPTION

In order to provide a more clear understanding of the objects, features, and advantages of the present disclosure, detail descriptions are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The described embodiments are only some of the embodiments of the present disclosure, but not all of the embodiments. Based on the embodiments in this disclosure, all other embodiments obtained by those of ordinary skill in the art without creative efforts shall fall within the protection scope of this disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
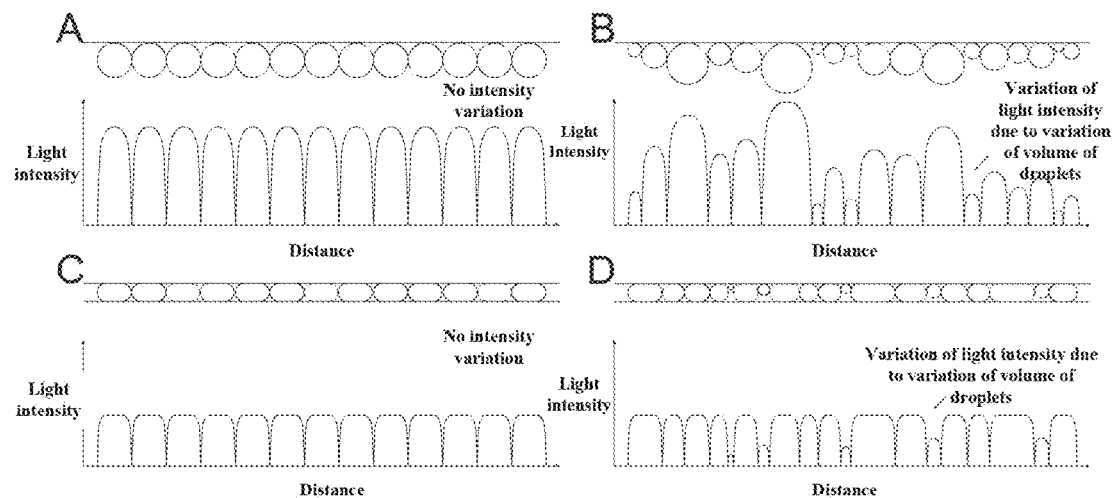
FIG. 1 is a schematic diagram illustrating a variation of intensities of optical signals due to a variation of volumes of droplets in the method of plane scanning.
Figure 2:
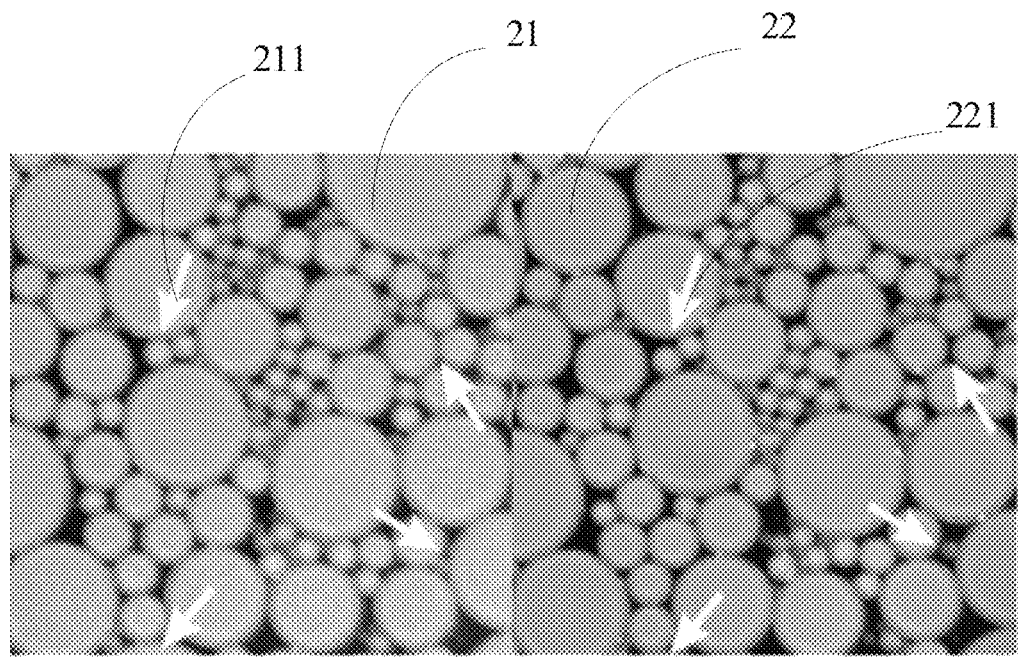
FIG. 2 illustrates a situation where droplet displacement occurs when a reference dye channel image and a working dye channel image are captured using the method of plane scanning.
Figure 3:
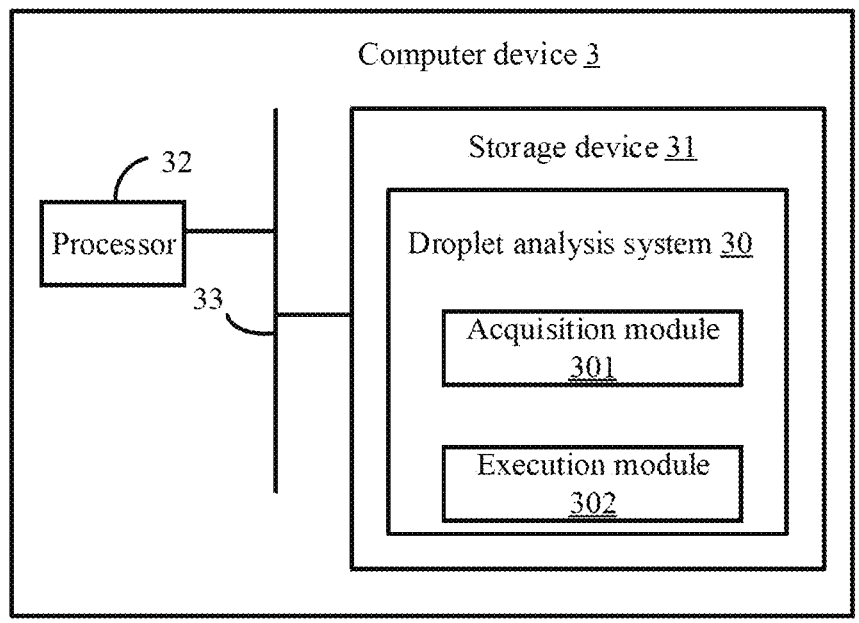
FIG. 3 illustrates an operating environment diagram of a droplet analysis system provided by a preferred embodiment of the present disclosure.

FIG. 3 is a diagram of one embodiment of an operating environment of a droplet analysis system provided by the present disclosure.

In one embodiment, a droplet analysis system 30 runs in a computer device 3. The droplet analysis system 30 can be used to analyze droplets based on images, such as analyzing relative light intensity of droplets, etc. The computer device 3 can include, but is not limited to, a storage device 31, processor 32, and at least one communication bus 33.

It should be understood by those skilled in the art that the structure of the computer device 3 shown in FIG. 3 does not constitute a limitation of the embodiment of the present disclosure. A structure of the computer device 3 can be either a bus-type structure or a star-shaped structure, and the computer device 3 can also include more or less other hardware or software than shown, or different component arrangements.

In at least one embodiment, the computer device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the computer device 3 is merely an example, and other existing or future computer devices suitable for the present disclosure may be included in the scope of the present disclosure, and are included in the reference.

In some embodiments, the storage device 31 can be used to store program codes and various data, such as the droplet analysis system 30 installed in the computer device 3, and automatically access the programs or data with high speed during the running of the computer device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other non-volatile readable storage medium that can be used to carry or store data.

In some embodiments, the at least one processor 32 may be composed of an integrated circuit, for example, may be composed of a single-packaged integrated circuit, or be composed of multiple integrated circuits of same function or different functions. The at least one processor 32 can include one or more central processing units (CPU), a microprocessor, a digital processing chip, a graphics processor, and various control chips. The at least one processor 32 is a control unit of the computer device 3, which connects various components of the computer device 3 using various interfaces and lines. By running or executing a computer program or modules stored in the storage device 31, and by invoking the data stored in the storage device 31, the at least one processor 32 can perform various functions of the computer device 3 and process data of the computer device 3. For example, the processor 32 may perform a function of analyzing droplets based on images (see description of FIG. 4 below for details).

In some embodiments, the at least one communication bus 33 is configured to enable communication between the storage device 31 and the at least one processor 32 and the like.

Although not shown, the computer device 3 may further include a power supply (such as a battery) for powering various components. Preferably, the power supply may be logically connected to the at least one processor 32 through a power management device, thereby, the power management device manages functions such as charging, discharging, and power management. The power supply may include one or more a DC or AC power source, a recharging device, a power failure detection circuit, a power converter or inverter, a power status indicator, and the like. The computer device 3 may further include various sensors, a BLUETOOTH module, a WI-FI module, and the like, and details are not described herein.

It should be understood that the embodiments are only used for illustration, and are not limited by this structure in the scope of the patent disclosure.

In some embodiments, the droplet analysis system 30 may include a plurality of functional modules composed of program code segments. Program codes of the program code segments in the droplet analysis system 30 may be stored in a storage device (e.g., the storage device 31 of the computer device 1) and executed by at least one processor (e.g., the processor 32) to implement the function of analyzing droplets based on images (see the description of FIG. 4 below for details).

In this embodiment, the droplet analysis system 30 can be divided into a plurality of functional modules according to the functions it performs. The functional modules may include: an acquisition module 301 and an execution module 302. The module referred to in this disclosure refers to a series of segments of computer-readable instructions that can be executed by at least one processor (such as the processor 32) and can perform fixed functions, which are stored in a storage device (such as the storage device 31 of the computer device 1). In this embodiment, the functions of each module will be described in detail in subsequent embodiments.

In this embodiment, integrated units implemented in a form of software function modules may be stored in a non-volatile readable storage medium. The above-mentioned software function modules include several computer-readable instructions for causing a computer device or processor to execute parts of the methods of various embodiments of the present disclosure, such as the method of analyzing droplets based on images shown in FIG. 4.

In a further embodiment, referring to FIG. 3, the at least one processor 32 can execute an operating device of the computer device 3 and various installed applications (such as the droplet analysis system 30), program codes, etc., for example, the various modules above.

Program codes are stored in the storage device 31, and the at least one processor 32 can call the program codes stored in the storage device 31 to perform related functions. For example, each module of the droplet analysis system 30 in FIG. 3 are program codes stored in the storage device 31 and executed by the at least one processor 32, so as to realize the functions of the various modules to achieve the purpose of analyzing droplets based on images (see description of FIG. 4 below for details).

In one embodiment of the present disclosure, the storage device 31 stores a plurality of computer-readable instructions, and the plurality of computer-readable instructions are executed by the at least one processor 32 to achieve the purpose of analyzing droplets based on images. Specifically, for the specific implementation method of the above computer-readable instructions by the at least one processor 32, please refer to the description of FIG. 4 below.

Figure 4:
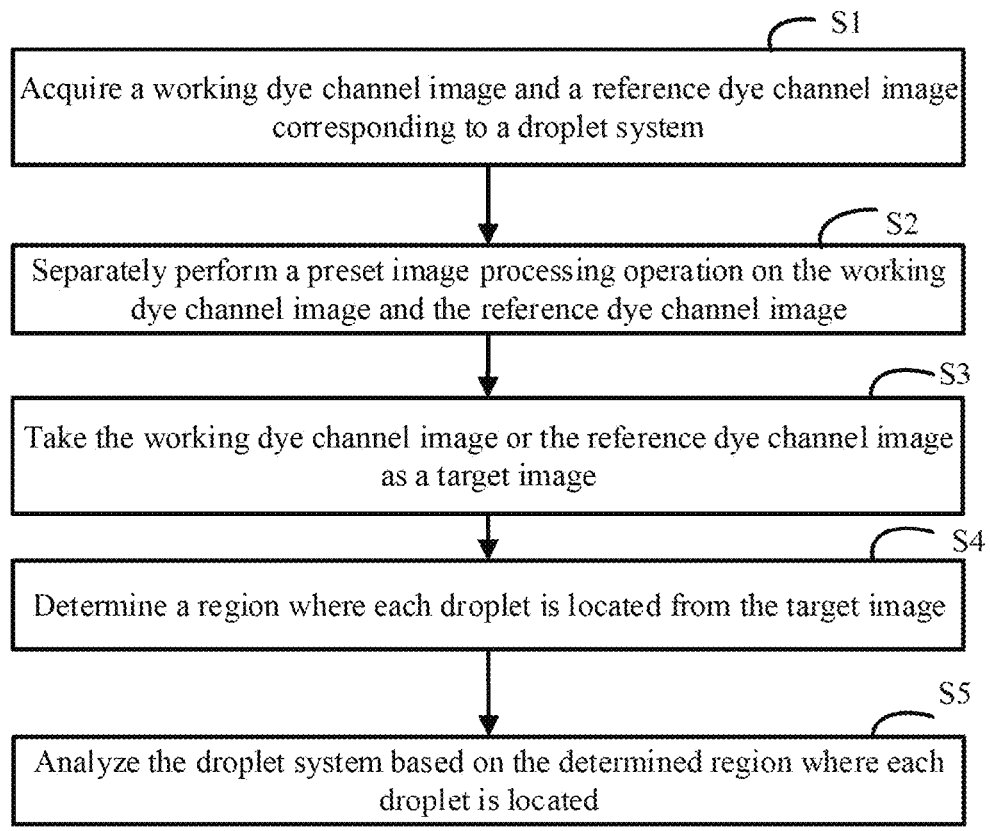
FIG. 4 illustrates a flow chart of a droplet analysis method provided by a preferred embodiment of the present disclosure.

Referring to FIG. 4, it is a flowchart of a method for analyzing droplets based on images according to a preferred embodiment of the present disclosure.

In this embodiment, the method for analyzing droplets based on images can be applied to the computer device 3. For the computer device 3 that needs to analyze droplets based on images, the function for analyzing droplets based on images provided by the method of the present disclosure can be directly integrated on the computer device 3, or can run on the computer device 3 in a form of a software development kit (SDK).

As shown in FIG. 4, the method for analyzing droplets based on images specifically includes the following blocks. According to different requirements, an order of the blocks in this flowchart can be changed, and some blocks can be omitted.

Block S1, the acquisition module 301 acquires a working dye channel image and a reference dye channel image corresponding to a droplet system.

In one embodiment, the acquiring the working dye channel image and the reference dye channel image corresponding to the droplet system includes:

Exciting a working dye and a reference dye in the droplet system separately under a condition of a dual/multi-channel wavelength; obtaining the working dye channel image by capturing a fluorescence image of a channel corresponding to the working dye, and obtaining the reference dye channel image by capturing a fluorescence image of a channel corresponding to the reference dye.

In one embodiment, the acquisition module 301 can separately excite the working dye and the reference dye in the droplet system under the condition of the dual/multi-channel wavelength using a method of plane scanning.

In this embodiment, the working dye channel image refers to the captured fluorescence image corresponding to the channel corresponding to the working dye. The reference dye channel image refers to the captured fluorescence image corresponding to the channel corresponding to the reference dye.

Specifically, when formulating a system to be emulsified, at least two indicator dyes with specific concentrations are added and mixed uniformly. A mixed system is emulsified into droplets, and conditions and operations required to perform reactions are performed on the droplets, so that all droplets in the system are fully reacted, thereby obtaining the droplet system.

In one embodiment, the at least two indicator dyes correspond to different excitation wavelengths, separately. The at least two indicator dyes include the working dye and the reference dye.

It should be noted that the working dye can indicate different concentrations of contents of droplets of the droplet system mixed with the working dye through a difference in a working signal intensity of an excitation light, so that different reaction states can be recorded. The reference dye is inert, neither participates in the reaction in the system nor inhibits or interferes with the reaction itself, and generally does not show different signal intensities as the concentration of the contents of droplets of the droplet system changes.

To facilitate the clear and simple description of the present disclosure, for example, a nuclease-free water mixture is prepared according to a concentration of 5 mM SYTO-9 and 2×ROX, and the nuclease-free water mixture and an emulsifier are mixed in a volume ratio of 1:10. Among them, a method of mixing includes: manual shaking or vortexing for 2 times, each time for 3 seconds, to form an emulsification system of droplets having multi-volume. Two indicator dyes that are added includes the working dye SYTO-9 and the reference dye ROX. It should be noted that the added working dye and the added reference dye are not limited to SYTO-9 and ROX. The emulsification system was loaded on a BGISeq-500 chip, and images of the chip are taken under an Olympus SZX16 stereo fluorescence microscope. Specifically, fluorescence channels of 480 nm/535 nm and 540 nm/605 nm were used for excitation and emission, separately, and the fluorescence images of the two dye channels of SYTO-9 and ROX (i.e., the working dye channel image and the reference dye channel image) are obtained by photographing.

It should be noted that the above-mentioned acquisition of the droplet system and the acquisition of the working dye channel image and the reference dye channel image are only examples, which are convenient for those skilled in the art to understand the present disclosure, and should not be construed as a limitation of the present disclosure.

Block S2, the execution module 302 separately performs a preset image processing operation on the working dye channel image and the reference dye channel image.

In one embodiment, the separately performing of the preset image processing operation on the working dye channel image and the reference dye channel image includes, but is not limited to, separately performing a correction operation for uneven background brightness on the working dye channel image and the reference dye channel image; separately performing an image enhancement processing on the reference dye channel image and the working dye channel image by using a preset image enhancement algorithm; and separately performing a noise reduction processing on the working dye channel image and the reference dye channel image by using a preset noise reduction algorithm.

It should be noted that, a sequence that the execution module 302 performs the correction operation for uneven background brightness, the image enhancement processing, and the noise reduction processing on the working dye channel image and the reference dye channel image may not be fixed.

In this embodiment, the performing of the correction operation for uneven background brightness on the working dye channel image and the reference dye channel image may include: obtaining a mask image using a Nearest Neighbor Resampling and polynomial fitting; and then subtracting the mask image from the original images (i.e., the working dye channel image and the reference dye channel image), thereby obtaining a corrected working dye channel image and a corrected reference dye channel image.

In one embodiment, the image enhancement algorithm includes, but is not limited to, a grayscale transformation algorithm, a histogram equalization algorithm, an adaptive histogram equalization algorithm, and the like.

In one implementation, the execution module 302 may first separately perform a grayscale transformation operation on the working dye channel image and the reference dye channel image, and separately perform a histogram equalization operation on the working dye channel image and the reference dye channel image, and then separately perform an adaptive histogram equalization operation on the working dye channel image and the reference dye channel image, thereby obtaining an enhanced working dye channel image and an enhanced reference dye channel image.

In one implementation, the execution module 302 may first perform an enhancement using an imadjust grayscale transformation method, and then saturate a preset percentage (e.g., 1%) of data in image to the lowest and highest brightness to increase a contrast value of an output image.

In one implementation, the noise reduction algorithm includes, but is not limited to, a non-local mean noise reduction algorithm, a gaussian scale hybrid noise reduction algorithm, a block matching three-dimensional filter noise reduction algorithm, and the like.

Block S3, the execution module 302 takes the working dye channel image or the reference dye channel image as a target image.

In this embodiment, the execution module 302 determines one of the working dye channel image and the reference dye channel image that is not taken as the target image as a non-target image.

In one embodiment, the execution module 302 may further take the target image as a fixed benchmark, and perform a registration operation on the non-target image.

In one embodiment, the taking of the working dye channel image or the reference dye channel image as the target image includes: randomly selecting one of the working dye channel image and the reference dye channel image as the target image.

In other embodiments, the taking of the working dye channel image or the reference dye channel image as the target image includes: selecting one of the working dye channel image and the reference dye channel image as the target image in response to a user's operation.

In one embodiment, the taking of the target image as the fixed benchmark, and the performing of the registration operation on the non-target image includes (a1)-(a2):

(a1) Taking the target image as the fixed benchmark, obtaining a first transformation matrix by performing a first image registration operation on the non-target image; and obtaining a first registration image based on the first transformation matrix and the non-target image.

In this embodiment, the first image registration operation includes, but is not limited to, a rigid transformation, a similarity transformation, an affine transformation, and a projection transformation.

Specifically, the first registration image is equal to a product of the first transformation matrix and the non-target image.

(a2) Taking the target image as the fixed benchmark; obtaining a second transformation matrix by performing a second image registration operation on the first registration image; obtaining a second registration image based on the second transformation matrix and the first registration image; and determining the second registration image as a registered non-target image.

In this embodiment, the second image registration operation includes, but is not limited to, an optical flow method, a B-spline method, and a Demons method.

Specifically, the second registration image is equal to a product of the second transformation matrix and the first registration image.

In one embodiment, the execution module 302 may also fill an irregular edge region of the registered non-target image as a foreground color.

For example, taking the reference dye channel image as the target image and taking the working dye channel image as the non-target image, the execution module 302 may take the reference dye channel image as a fixed benchmark, and perform the registration operation on the working dye channel image.

Specifically, the execution module 302 takes the reference dye channel image as the fixed benchmark, performs the first image registration operation on the working dye channel image and obtains the first transformation matrix, and obtains the first registration image based on the first transformation matrix and the working dye channel image. The first registration image is equal to the product of the first transformation matrix and the working dye channel image.

Then, the execution module 302 takes the reference dye channel image as the fixed benchmark, performs the second image registration operation on the first registration image to obtain the second transformation matrix, and obtains a second registration image based on the second transformation matrix and the first registration image, and determines the second registration image as a registered working dye channel image. The second registration image is equal to a product of the second variation matrix and the first registration image.

In one embodiment, the execution module 302 may also fill an irregular edge region of the registered working dye channel image with a foreground color.

It should be noted that an effect of fluid disturbance on the non-target image can be eliminated through the registration operation on the non-target image. That is, the problem of droplet displacement, repeated statistics or droplet loss caused by droplet flow, local disturbance or Brownian motion is solved through image registration, and the accuracy of image processing and data calculation is improved.

Figures 5, 6:
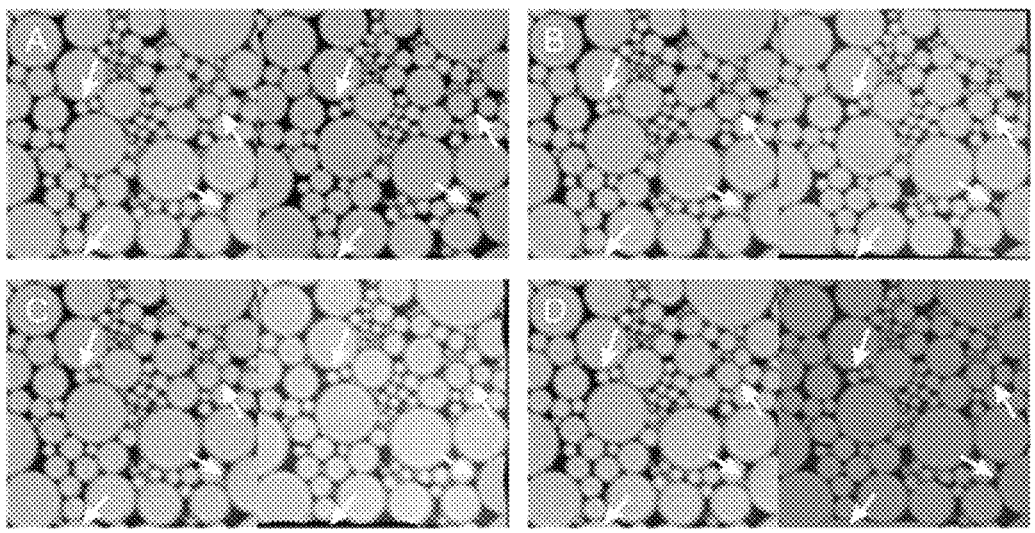
FIG. 5 illustrates a schematic diagram of performing two registrations on the working dye channel image using the reference dye channel image as a fixed benchmark.
FIG. 6 illustrates an information table recording information about a region where each droplet is located.

For example, referring to FIG. 5, FIG. 5 illustrates a schematic diagram of performing a second registration on the working dye channel image with the reference dye channel image as a fixed benchmark. Among them, a left side of "A" in FIG. 5 is the reference dye channel image, and a right side is the working dye channel image; a left side of "B" is the reference dye channel image, and a right side is the working dye channel image corrected by the first registration; a left side of "C" is the reference dye channel image, and a right side is the working dye channel image corrected by the second registration; a left side of "D" is the reference dye channel image, and a right side is the working dye channel image by filling irregular black edges. It can be seen from FIG. 5, after the secondary registration of the working dye channel image, the working dye channel image is basically aligned with the reference dye channel image, thus effectively solving the problems caused by droplet flow, local disturbance or Brownian motion. It can improve the accuracy of image processing and data calculation.

It should also be noted that the operation of performing registration on the non-target image may also be performed before performing the preset image processing operation on the working dye channel image and the reference dye channel image.

In addition, it should be noted that, in the case of no droplet flow, no local disturbance and no Brownian motion, the registration operation may not be performed on the non-target image. For example, when using a continuous phase material that can achieve artificially controlled phase transitions, after emulsification and before taking images of the channel corresponding to the working dye and the channel corresponding to the reference dye, the continuous phase material can be coagulated into a light-transmitting solid by changing conditions, thereby the droplets are enclosed in solid-phase cavities, so there is no flow, no local disturbance, and no Brownian motion that causes droplet drift.

Block S4, the execution module 302 determines a region where each droplet is located from the target image.

In one embodiment, the determining of the region where each droplet is located from the target image includes (b1)-(b3):

(b1) Performing a local contrast enhancement processing on the target image.

It should be noted that, by performing the local contrast enhancement processing on the target image, an accuracy of extracting an edge of each droplet can be improved.

(b2) Obtaining a grayscale image by performing a grayscale conversion on the target image, and binarizing the grayscale image, thereby obtaining a binarized target image.

(b3) Dividing the binarized target image into several discrete image regions, and each image region in the several discrete image regions corresponds to a single droplet, thereby determining the region where each droplet is located.

In one embodiment, the execution module 302 may also mark the region where each droplet is located.

In this embodiment, the execution module 302 may first process the target image by using a binarized image distance transformation method, and then obtain a grayscale terrain image of the processed target image, and then obtain watershed dividing lines of the grayscale terrain image by using a dam transformation method, and further divide the target image into the several discrete image regions according to the watershed dividing lines.

Specifically, the execution module 302 can first use a bwdist binarization image distance transformation method to process the target image, and then obtain the grayscale terrain image of the processed target image, and then obtain watershed dividing lines of the grayscale terrain image through a watershed dam transformation method, and then divide adjacent regions of droplets in the target image according to the watershed dividing lines, thereby obtaining the several discrete image regions. In this embodiment, the execution module 302 may use a bwlabel method to mark the region where each droplet is located, thereby the regions where different droplets are located are marked with different label values.

It should be noted that when the reference dye channel image is taken as the target image, since the non-target image, i.e., the working dye channel image, is registered with the reference dye channel image as a benchmark, therefore, The label value marked on the target image (i.e., the reference dye channel image) for the region where each droplet is located is also applicable to the non-target image, i.e., the working dye channel image (i.e., it is also possible to determine the region each droplet is located on the working dye channel image according to the label value). Similarly, when the working dye channel image is taken as the target image, since the non-target image, i.e., the reference dye channel image, is registered with the working dye channel image as the benchmark, therefore, the label value marked on the region where each droplet is located on the target image, namely the reference dye channel image, is also applicable to the non-target image, i.e., the reference dye channel image (i.e., the region occupied by each droplet in the reference dye channel image can also be determined according to the label value).

Block S5, the execution module 302 analyzes the droplet system based on the determined region where each droplet is located.

In one implementation, the analyzing of the droplet system based on the determined region where each droplet is located includes: calculating a relative light intensity ($I_{Rela}$) of each droplet (Droplet Relative Intensity).

In one implementation, the calculating of the relative light intensity of each droplet includes (c1)-(c2):

(c1) Calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located.

In one embodiment, the average light intensity ($I_{Abs}$) of each droplet on the working dye channel image is obtained by dividing a sum of gray values of all pixel points corresponding to each droplet on the working dye channel image by a total number of all pixel points corresponding to each droplet on the working dye channel image. The average light intensity ($I_{Ref}$) of each droplet on the reference dye channel image is obtained by dividing a sum of gray values of all pixel points corresponding to each droplet on the reference dye channel image by a total number of all pixel points corresponding to each droplet on the reference dye channel image.

For example, the average light intensity ($I_{Abs}$) of droplet "A" on the working dye channel image is equal to a sum of grayscale values of all pixel points corresponding to a region where the droplet "A" is located on the working dye channel image divided by a total number of all pixel points in the region where the droplet "A" is located on the working dye channel image. Similarly, the average light intensity ($I_{Ref}$) of droplet "A" on the reference dye channel image is equal to a sum of gray values of all pixel points corresponding to a region where the droplet "A" is located on the reference dye channel image divided by a total number of all pixel points in the region where the droplet "A" is located on the reference dye channel image.

(c2) Calculating the relative light intensity ($I_{rela}$) of each droplet based on the average light intensity ($I_{Abs}$) of each droplet on the working dye channel and the average light intensity ($I_{Ref}$) of each droplet on the reference dye channel image, wherein $I_{Rela}=I_{Abs}/I_{Ref}$ In other embodiments, when the present disclosure is applied to an application case of digital nucleic acid amplification detection, the droplets of digital PCR have different light intensities, and it is necessary to classify the droplets, such as classifying the droplets into negative droplets and positive droplets, and a concentration of a target molecule is calculated based on the a result of classification of the droplets. Therefore, the execution module 302 may further classify the droplets according to the relative light intensity ($I_{Rela}$) of each droplet.

Specifically, the classifying of the droplets according to the relative light intensity ($I_{Rela}$) of each droplet includes:

When the relative light intensity ($I_{Rela}$) of any one droplet of the droplets is greater than a preset threshold value, determining that the any one droplet includes a target detection substance, and determining a category of the any one droplet to be a positive droplet. Conversely, when the relative light intensity of the any one droplet is less than or equal to the preset threshold value, determining that the any one droplet does not include the target detection substance, and determining a category of the any one droplet to be a negative droplet.

For example, referring to FIG. 6, it is an information table that records information of the region where each droplet is located. As can be seen from the FIG. 6, a pixel area of a droplet numbered as "1" is 41688, an average light intensity ($I_{Abs}$) of the droplet numbered as "1" on the working dye channel image is 181.3267, an average light intensity of the droplet numbered "1" on the reference dye channel image is 53.56853, a relative light intensity of the droplet numbered as "1" is 3.384947; since the relative light intensity of the droplet numbered as "1" is greater than a preset threshold value 2.9, therefore, the droplet numbered as "1" is classified to the positive droplet (indicated by "+" in the information table).

Figure 7:
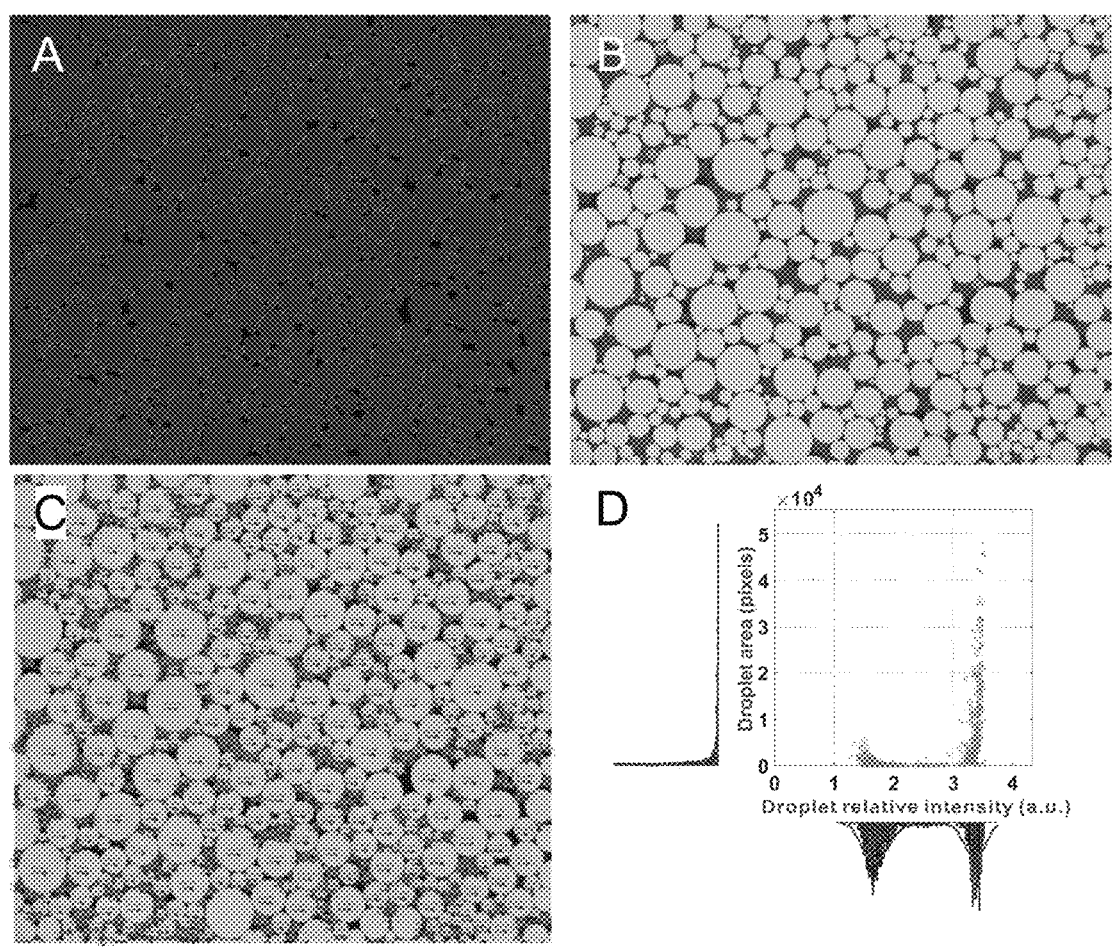
FIG. 7 illustrates that after performing a preset image processing operation on the working dye channel image and the reference dye channel image and performing two registrations on the working dye channel image or the reference dye channel image which is taken as the target image, droplets are divided into negative droplets and positive droplets according to relative light intensities of the droplets.

For another example, referring to FIG. 7, FIG. 7 illustrates that the preset image processing operation is performed on the working dye channel image and the reference dye channel image, and after the working dye channel image or the reference dye channel image which is determined as the target image has been registered twice, the droplets can be divided into the negative droplets and the positive droplets, according to their relative light intensities. Among them, in FIG. 7, "A" represents a region of each droplet marked in the reference dye channel image; "B" represents a region of each droplet marked in the working dye channel image; "C" represents a marking and a calculation of the relative light intensity and a pixel area of each droplet according to a label value of each droplet (for example, a pixel area of a droplet numbered as "795" (i.e. drop795) is 28702 and the relative light intensity of the droplet numbered as "795" is 3.36); "D" represents a double scatter histogram between the relative light intensities and pixel areas of all droplets.

In one embodiment, the execution module 302 may determine the preset threshold value using a clustering algorithm based on the relative light intensity of each of all droplets in the droplet system.

Specifically, the execution module 302 can obtain a scatter plot with the number of each droplet as a horizontal axis and the relative light intensity of each droplet as a vertical axis, and determine the threshold value by using a K-Means clustering algorithm based on the obtained scatter plot.

In one embodiment, the execution module 302 may also calculate a volume "v" of each droplet according to a total number of pixel points in the region where each droplet is located and a predetermined image pixel length conversion ratio.

Specifically, the method for determining the image pixel length conversion ratio by the execution module 302 includes:

Taking an image of a preset square using a microscope under a preset microscope magnification;

Calculating a total number of pixel points included in a side length of the preset square in the captured image; and Calculating the image pixel length conversion ratio based on the total number of pixel points included in the calculated side length of the preset square and an actual side length of the preset square.

For example, assuming that the total number of pixel points included in a side length of the preset square in the captured image equals 1150 pixel points, and an actual side length of the preset square equals 2 mm, then the image pixel length conversion ratio is 1.73660264 μm/pixel.

It should be noted that the preset microscope magnification refers to a magnification used by the microscope when the working dye channel image and the reference dye channel image are captured.

In one embodiment, the execution module 302 may also count the total number of all droplets in the droplet system according to a total number of the label values.

In one embodiment, the execution module 302 may further calculate a quantitative result of the content of the droplet, i.e., a concentration of the target detection substance. The concentration of the target detection substance can be calculated according to a total number of positive droplets included in the droplet system and a total volume of the droplet system.

According to the above description, the method of analyzing droplets based on images of the embodiments of the present disclosure obtains relevant information of the droplet system, such as the content of each droplet and the classification results, etc., based on the working dye channel image and the reference dye channel image, can effectively solve the technical problem of uneven optical signals caused by non-uniform droplet volumes, which makes it impossible to accurately obtain the relevant information of the droplet system based on the collected optical signals.

In addition, in the process of capturing the working dye channel image and the reference dye channel image, even if the droplet is displaced, lost due to flow, local disturbance or Brownian motion, and results the working dye channel image and the reference dye channel image are not captured based on a same state, because this disclosure sets the reference dye channel image as the benchmark in the process of processing the working dye channel image and the reference dye channel image, and registers the working dye channel image, so that the relevant information of the droplet system obtained based on the analysis of the working dye channel image and the reference dye channel image is more accurate.

Figure 8:
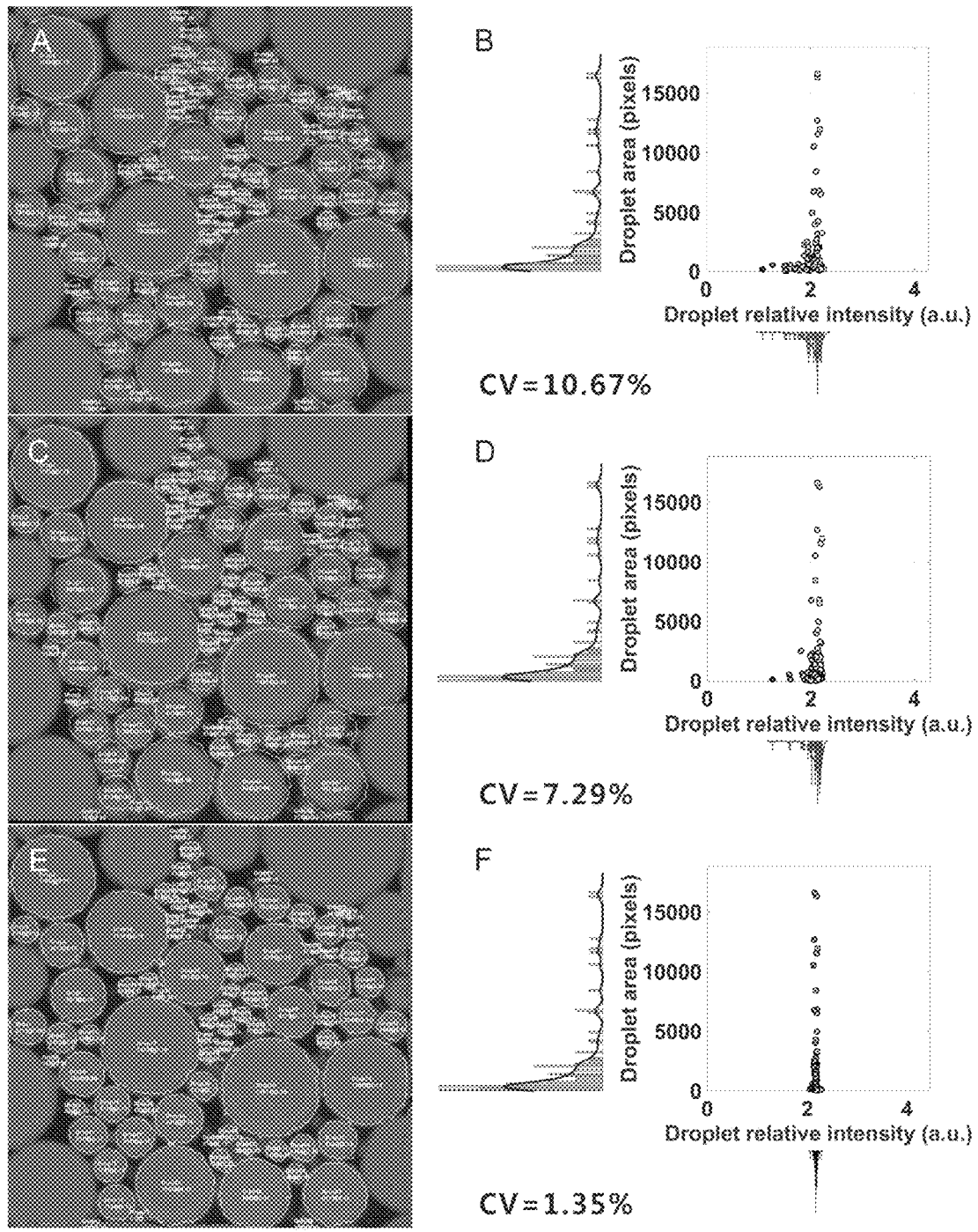
FIG. 8 illustrates a significant reduction in the coefficient of variation of the relative light intensity of the droplet after performing two registrations on the working dye channel image.

For example, please refer to FIG. 8, in which, "A" illustrates an information overlay of the working dye channel image without registration correction and the regions of droplets that are segmented; "B" illustrates a scatter double-frequency histogram fitting diagram between the relative light intensities of the droplets and the pixel area of the droplet (i.e., the total number of pixel points) obtained according to the regions of droplets that are segmented in the working dye channel image without registration correction. A coefficient of variation (CV) of the relative light intensity of the droplet equals 10.67%; "C" is an information overlay of the working dye channel image corrected by the first registration and the regions of droplets that are segmented; "D" is a scatter-point double-frequency histogram fitting diagram between the relative light intensity of the droplet and the pixel area of the droplet obtained according to the regions of the droplets that are segmented in the working dye channel image corrected by the first registration, a coefficient of variation of the relative light intensity of the droplet is 7.29%; "E" illustrates an information overlay of the working dye channel image corrected by the second registration and the regions of droplets that are segmented; "F" is a scatter-point double-frequency histogram fitting diagram between the relative light intensity of the droplet and the pixel area of the droplet obtained according to the regions of the droplets that are segmented in the working dye channel image corrected by the second registration, a coefficient of variation of the droplet relative light intensity is 1.35%. As can be seen from the above data analysis in FIG. 8, the coefficient of variation of the relative light intensity of the droplets is significantly reduced after performing two registrations on the working dye channel image. Therefore, the relevant information of the droplet (such as the content of the droplet, etc.) calculated based on the relative light intensity of the droplet obtained from the working dye channel image after performing two registrations can be more accurate.

It should be noted that, in the several embodiments provided in this disclosure, it should be understood that the disclosed non-volatile readable storage medium, device and method may be implemented in other manners. For example, the device embodiments described above are only illustrative. For example, the division of the modules is only a logical function division, and there may be other division manners in actual implementation.

The modules described as separate components may or may not be physically separated, and the components shown as modules may or may not be physical units, that is, may be located in one place, or may be distributed to a plurality of network units. Some or all of the modules may be selected according to actual needs to achieve the purpose of the solution in this embodiment.

In addition, each functional module in each embodiment of the present disclosure may be integrated into one processing unit, or each unit may exist physically alone, or two or more units may be integrated into one unit. The above-mentioned integrated units can be implemented in the form of hardware, or can be implemented in the form of hardware plus software function modules.

It will be apparent to those skilled in the art that the present disclosure is not limited to the details of the above-described exemplary embodiments, but that the present disclosure may be implemented in other specific forms without departing from the spirit or essential characteristics of the present disclosure. Accordingly, the embodiments are to be regarded in all respects as illustrative and not restrictive, and the scope of the disclosure is to be defined by the appended claims rather than the foregoing description, which is therefore intended to fall within the scope of the claims. All changes within the meaning and scope of the equivalents of, are included in this disclosure. Any reference signs in the claims shall not be construed as limiting the involved claim. Furthermore, it is clear that the word "including" does not exclude other units or, and the singular does not exclude the plural. Several units or means recited in the device claims can also be realized by one unit or means by means of software or hardware. The terms first, second, etc. are used to denote names and do not denote any particular order.

Finally, it should be noted that the above embodiments are only used to illustrate the technical solutions of the present disclosure and not to limit them. Although the present disclosure has been described in detail with reference to the preferred embodiments, those of ordinary skill in the art should understand that the technical solutions of the present disclosure can be modifications or equivalent substitutions can be made without departing from the spirit and scope of the technical solutions of the present disclosure.

What is claimed is:

1. A method for analyzing droplets based on images, comprises:
   acquiring a working dye channel image and a reference dye channel image corresponding to a droplet system;
   separately performing a preset image processing operation on the working dye channel image and the reference dye channel image;
   taking the working dye channel image or the reference dye channel image as a target image;
   determining a region where each droplet is located from the target image; and
   analyzing the droplet system based on the determined region where each droplet is located.

2. The method for analyzing droplets based on images according to claim 1, wherein the acquiring the working dye channel image and the reference dye channel image corresponding to the droplet system comprises: exciting a working dye and a reference dye in the droplet system separately under a condition of a dual/multi-channel wavelength, obtaining the working dye channel image by capturing a fluorescence image of a channel corresponding to the working dye, and obtaining the reference dye channel image by capturing a fluorescence image of a channel corresponding to the reference dye.

3. The method for analyzing droplets based on images according to claim 1, wherein the separately performing the preset image processing operation on the working dye channel image and the reference dye channel image comprises:
   separately performing a correction operation for uneven background brightness on the working dye channel image and the reference dye channel image;
   separately performing an image enhancement processing on the reference dye channel image and the working dye channel image by using a preset image enhancement algorithm; and
   separately performing a noise reduction processing on the working dye channel image and the reference dye channel image by using a preset noise reduction algorithm.

4. The method for analyzing droplets based on images according to claim 1, wherein the determining the region where each droplet is located from the target image comprises:
   performing a local contrast enhancement processing on the target image;
   obtaining a grayscale image by performing a grayscale conversion on the target image, and obtaining a binarized target image by binarizing the grayscale image;
   dividing the binarized target image into several discrete image regions, and each image region in the several discrete image regions being corresponding to a single droplet, thereby determining the region where each droplet is located.

5. The method for analyzing droplets based on images according to claim 1, wherein before the determining of the region where each droplet is located from the target image, the method further comprises:
   determining one of the working dye channel image and the reference dye channel image that is not taken as the target image as a non-target image, taking the target image as a fixed benchmark, and performing a registration operation on the non-target image.

6. The method for analyzing droplets based on images according to claim 5, wherein the taking of the target image as the fixed benchmark, and the performing of the registration operation on the non-target image comprise:
   taking the target image as the fixed benchmark; obtaining a first transformation matrix by performing a first image registration operation on the non-target image; and obtaining a first registration image based on the first transformation matrix and the non-target image;
   taking the target image as the fixed benchmark; obtaining a second transformation matrix by performing a second image registration operation on the first registration image; obtaining a second registration image based on the second transformation matrix and the first registration image; and determining the second registration image as a registered non-target image.

7. The method for analyzing droplets based on images according to claim 1, wherein the analyzing the droplet system based on the determined region where each droplet is located comprises:
   calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located;
   calculating the relative light intensity ($I_{rela}$) of each droplet based on the average light intensity ($I_{Abs}$) of each droplet on the working dye channel and the average light intensity ($I_{Ref}$) of each droplet on the reference dye channel image, and $I_{Rela} = I_{Abs}/I_{Ref}$.

8. A computer device, characterized in that the computer device comprises a storage device and a processor, the storage device storing at least one computer readable instruction, which when executed by the processor, cause the processor to: acquire a working dye channel image and a reference dye channel image corresponding to a droplet system;
   separately perform a preset image processing operation on the working dye channel image and the reference dye channel image;
   take the working dye channel image or the reference dye channel image as a target image;
   determine a region where each droplet is located from the target image; and
   analyze the droplet system based on the determined region where each droplet is located.

9. The computer device according to claim 8, wherein the processor is further caused to: excite a working dye and a reference dye in the droplet system separately under a condition of a dual/multi-channel wavelength, obtain the working dye channel image by capturing a fluorescence image of a channel corresponding to the working dye, and obtain the reference dye channel image by capturing a fluorescence image of a channel corresponding to the reference dye.

10. The computer device according to claim 8, wherein the processor is further caused to:
    separately perform a correction operation for uneven background brightness on the working dye channel image and the reference dye channel image;
    separately perform an image enhancement processing on the reference dye channel image and the working dye channel image by using a preset image enhancement algorithm; and
    separately perform a noise reduction processing on the working dye channel image and the reference dye channel image by using a preset noise reduction algorithm.

11. The computer device according to claim 8, wherein the processor is further caused to: perform a local contrast enhancement processing on the target image;
    obtain a grayscale image by performing a grayscale conversion on the target image, and obtain a binarized target image by binarizing the grayscale image;
    divide the binarized target image into several discrete image regions, and each image region in the several discrete image regions being corresponding to a single droplet, thereby the region where each droplet is located is determined.

12. The computer device according to claim 8, wherein the processor is further caused to: determine one of the working dye channel image and the reference dye channel image that is not taken as the target image as a non-target image, take the target image as a fixed benchmark, and perform a registration operation on the non-target image.

13. The computer device according to claim 12, wherein the taking of the target image as the fixed benchmark, and the performing of the registration operation on the non-target image, comprise:
    taking the target image as the fixed benchmark; obtaining a first transformation matrix by performing a first image registration operation on the non-target image; and obtaining a first registration image based on the first transformation matrix and the non-target image;
    taking the target image as the fixed benchmark; obtaining a second transformation matrix by performing a second image registration operation on the first registration image; obtaining a second registration image based on the second transformation matrix and the first registration image; and determining the second registration image as a registered non-target image.

14. The computer device according to claim 8, wherein the processor is further caused to:
    calculate an average light intensity ($I_{Abs}$) of each droplet on the working dye channel image according to the region where each droplet is located, and calculate an average light intensity ($I_{ref}$) of each droplet on the reference dye channel image according to the region where each droplet is located;
    calculate the relative light intensity ($I_{rela}$) of each droplet based on the average light intensity ($I_{Abs}$) of each droplet on the working dye channel and the average light intensity ($I_{Ref}$) of each droplet on the reference dye channel image, and $I_{Rela} = I_{Abs}/I_{Ref}$.

15. A non-transitory storage medium having instructions stored thereon, when the instructions are executed by a processor of a computer device, the processor is caused to perform a method for analyzing droplets based on images, wherein the method comprises:
    acquiring a working dye channel image and a reference dye channel image corresponding to a droplet system;
    separately performing a preset image processing operation on the working dye channel image and the reference dye channel image;
    taking the working dye channel image or the reference dye channel image as a target image;
    determining a region where each droplet is located from the target image; and
    analyzing the droplet system based on the determined region where each droplet is located.

16. The non-transitory storage medium according to claim 15, wherein the acquiring the working dye channel image and the reference dye channel image corresponding to the droplet system comprises:
    exciting a working dye and a reference dye in the droplet system separately under a condition of a dual/multi-channel wavelength, obtaining the working dye channel image by capturing a fluorescence image of a channel corresponding to the working dye, and obtaining the reference dye channel image by capturing a fluorescence image of a channel corresponding to the reference dye.

17. The non-transitory storage medium according to claim 15, wherein the separately performing the preset image processing operation on the working dye channel image and the reference dye channel image comprises:
    separately performing a correction operation for uneven background brightness on the working dye channel image and the reference dye channel image;

separately performing an image enhancement processing on the reference dye channel image and the working dye channel image by using a preset image enhancement algorithm; and separately performing a noise reduction processing on the working dye channel image and the reference dye channel image by using a preset noise reduction algorithm.

18. The non-transitory storage medium according to claim 15, wherein the determining the region where each droplet is located from the target image comprises:

performing a local contrast enhancement processing on the target image;

obtaining a grayscale image by performing a grayscale conversion on the target image, and obtaining a binarized target image by binarizing the grayscale image;

dividing the binarized target image into several discrete image regions, and each image region in the several discrete image regions being corresponding to a single droplet, thereby determining the region where each droplet is located.

19. The non-transitory storage medium according to claim 15, wherein before the determining of the region where each droplet is located from the target image, the method further comprises:

determining one of the working dye channel image and the reference dye channel image that is not taken as the target image as a non-target image, taking the target image as a fixed benchmark, and performing a registration operation on the non-target image;

taking the target image as the fixed benchmark; obtaining a first transformation matrix by performing a first image registration operation on the non-target image; and obtaining a first registration image based on the first transformation matrix and the non-target image;

taking the target image as the fixed benchmark; obtaining a second transformation matrix by performing a second image registration operation on the first registration image; obtaining a second registration image based on the second transformation matrix and the first registration image; and determining the second registration image as a registered non-target image.

20. The non-transitory storage medium according to claim 15, wherein the analyzing the droplet system based on the determined region where each droplet is located comprises:

calculating an average light intensity ($I_{Abs}$) of each droplet on the working dye channel image according to the region where each droplet is located, and calculating an average light intensity ($I_{ref}$) of each droplet on the reference dye channel image according to the region where each droplet is located;

calculating the relative light intensity ($I_{rela}$) of each droplet based on the average light intensity ($I_{Abs}$) of each droplet on the working dye channel and the average light intensity ($I_{Ref}$) of each droplet on the reference dye channel image, and $I_{Rela}=I_{Abs}/I_{Ref}$.

* * * * *